(12) United States Patent
Oyaizu

(10) Patent No.: US 11,107,247 B2
(45) Date of Patent: Aug. 31, 2021

(54) CALIBRATION DEVICE, CALIBRATION METHOD, AND CALIBRATION CHART DEVICE

(71) Applicant: SONY CORPORATION, Tokyo (JP)

(72) Inventor: Hideki Oyaizu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/959,504

(22) PCT Filed: Oct. 25, 2018

(86) PCT No.: PCT/JP2018/039657
§ 371 (c)(1),
(2) Date: Jul. 1, 2020

(87) PCT Pub. No.: WO2019/138646
PCT Pub. Date: Jul. 18, 2019

(65) Prior Publication Data
US 2021/0056726 A1 Feb. 25, 2021

(30) Foreign Application Priority Data

Jan. 10, 2018 (JP) .............................. JP2018-001755

(51) Int. Cl.
| | | |
|---|---|---|
| *G06T 7/80* | (2017.01) | |
| *G01J 5/02* | (2006.01) | |
| *H04N 5/33* | (2006.01) | |
| *G01J 5/00* | (2006.01) | |

(52) U.S. Cl.
CPC ................. *G06T 7/80* (2017.01); *G01J 5/02* (2013.01); *H04N 5/33* (2013.01);
(Continued)

(58) Field of Classification Search
CPC ............. G06T 7/80; G06T 2207/10048; G06T 2207/30208; G01J 5/02; G01J 2005/0048;
(Continued)

(56) References Cited

U.S. PATENT DOCUMENTS

2001/0012985 A1 8/2001 Okamoto et al.
2004/0066965 A1* 4/2004 Watanabe ............ H04N 13/246
382/154

FOREIGN PATENT DOCUMENTS

EP 1120746 A2 8/2001
JP 11-337493 A 12/1999
(Continued)

OTHER PUBLICATIONS

Xiao, et al. "Accurate Feature Extraction and Control Point Correction for Camera Calibration with a Mono-Plane Target", Proceedings of 3DPVT 2010, 2010, 7 pages.
(Continued)

*Primary Examiner* — David P Porta
*Assistant Examiner* — Meenakshi S Sahu
(74) *Attorney, Agent, or Firm* — Chip Law Group

(57) ABSTRACT

In a calibration chart device 20, a peak detector 32 detects, from plural infrared images shot at respective movement positions by an infrared camera IRC by sequentially moving a marker whose distribution of an infrared-ray radiation amount in a moving direction is a unimodal distribution in a first direction and plural infrared images shot at respective movement positions by the infrared camera IRC by sequentially moving the marker in a second direction different from the first direction, a position of the marker at which a pixel value is maximized, for each pixel. A calibration processor 36 calculates a camera parameter by using the position of the marker detected by the peak detector 32 for each pixel. With this configuration, calibration of the infrared camera can be performed with ease.

14 Claims, 12 Drawing Sheets

(52) U.S. Cl.
CPC ............... *G01J 2005/0048* (2013.01); *G01J 2005/0077* (2013.01); *G06T 2207/10048* (2013.01); *G06T 2207/30208* (2013.01)

(58) Field of Classification Search
CPC . G01J 2005/0077; H04N 5/33; H04N 17/002; H04N 5/232
See application file for complete search history.

(56) References Cited

FOREIGN PATENT DOCUMENTS

| | | | |
|---|---|---|---|
| JP | 2001-285681 | A | 10/2001 |
| JP | 2004-128887 | A | 4/2004 |
| JP | 2008-202971 | A | 9/2008 |
| KR | 10-2001-0078102 | A | 8/2001 |

OTHER PUBLICATIONS

Ouellet, et al. "A Simple Operator for Very Precise Estimation of Ellipses", Fourth Canadian Conference on Computer and Robot Vision(CRV'07), 2007 IEEE, 8 pages.

Lenz, et al. "Techniques for Calibration of the Scale Factor and Image Center for High Accuracy 3-D Machine Vision Metrology", IEEE Transactions on Pattern Analysis and Machine Intelligence, vol. 10, No. 5, Sep. 1988, 713-720 pages.

Lenz, et al., "Techniques for Calibration of the Scale Factor and Image Center for High Accuracy 3-D Machine Vision Metrology", IEEE Transactions on Pattern Analysis and Machine Intelligence, vol. 10, No. 5, Sep. 1988, pp. 713-720.

Ouellet, et al., "A Simple Operator for Very Precise Estimation of Ellipses", Fourth Canadian Conference on Computer and Robot Vision (CRV '07), Jun. 11, 2007, 8 Pages.

Ouellet, et al. "A Simple Operator for Very Precise Estimation of Ellipses", Fourth Canadian Conference on Computer and Robot Vision(CRV'07), 2007, 8 pages.

Reimar, et al. "Techniques for Calibration of the Scale Factor and Image Center for High Accuracy 3-D Machine Vision Metrology", IEEE Transactions on Pattern Analysis and Machine Intelligence, vol. 10, No. 5, Sep. 1988, 713-720 pages.

International Search Report and Written Opinion of PCT Application No. PCT/JP2018/039657, dated Jan. 15, 2019, 08 pages of ISRWO.

* cited by examiner

CALIBRATION DEVICE, CALIBRATION METHOD, AND CALIBRATION CHART DEVICE

CROSS REFERENCE TO RELATED APPLICATIONS

This application is a U.S. National Phase of International Patent Application No. PCT/JP2018/039657 filed on Oct. 25, 2018, which claims priority benefit of Japanese Patent Application No. JP 2018-001755 filed in the Japan Patent Office on Jan. 10, 2018. Each of the above-referenced applications is hereby incorporated herein by reference in its entirety.

TECHNICAL FIELD

The present technology relates to a calibration device, a calibration method, and a calibration chart device and facilitates calibration of an infrared camera.

BACKGROUND ART

Conventionally, to accurately perform processing such as recognition or depth estimation using a shot image, calculation of internal parameters regarding characteristics (e.g., lens distortion and FOV (field of view)) of an optical system of a camera and external parameters regarding a position and posture of the camera is performed.

For example, NPL 1 discloses a technology that shoots a chart having a marker whose three-dimensional position is known and calculates the internal parameters and the external parameters, based on the image thus obtained. In addition, NPL 2 discloses a method for accurately obtaining a position of a blurred marker. Further, NPL 3 discloses a technology that obtains a position of a marker edge as a position where a difference of pixel values between the inside and the outside of the ellipse used for fitting is maximized, thereby accurately detecting a position of a marker.

CITATION LIST

Non Patent Literature

[NPL 1]
R. Lenz and R. Tsai, "Techniques for calibration of the scale factor and image center for high accuracy 3-D machine vision metrology," IEEE Trans. Pattern Anal. Mach. Intell., vol. 10, no. 5, pp. 713-720, September 1988.
[NPL 2]
Ouellet, Jean-Nicolas, and Patrick Hebert. "A simple operator for very precise estimation of ellipses." Computer and Robot Vision, 2007. CRV'07. Fourth Canadian Conference on. IEEE, 2007.
[NPL 3]
Xiao, Yijun, and R. B. Fisher. "Accurate feature extraction and control point correction for camera calibration with a mono-plane target." Proc. Int. Conf. on 3D Processing. 2010.

SUMMARY

Technical Problems

Meanwhile, an infrared camera captures infrared rays from an object, as an image. This enables detection of a subject having temperature even during night or bad weather, for example. Further, in a case where the infrared camera is used for recognition processing, calibration needs to be performed similarly to a typical camera (visible light camera) that has sensitivity to visible light.

The infrared camera increases in price with higher resolution. The resolution of the infrared camera embedded in a consumer apparatus is often extremely low in comparison with that of the visible light camera. In a case where calibration of such a low-resolution infrared camera is performed, it is difficult to apply the technologies disclosed in NPL 2 and NPL 3 to the calibration due to the low resolution. Further, the low resolution leads to a decrease in the number of markers that can be shot in one image. Therefore, it is necessary to increase an information amount by increasing calibration charts or variations of a shooting direction. However, the increase in information amount leads to an increase in time necessary for calibration processing and an increase in size of, for example, an inspection jig necessary for performing the calibration processing. It is therefore difficult to perform the calibration with low-cost and ease.

In view of this situation, an object of this technology is to provide a calibration device, a calibration method, and a calibration chart device that facilitate calibration of an infrared camera.

Solution to Problems

A first aspect of this technology is a calibration device including a peak detector that detects, from plural infrared images shot by sequentially moving a marker whose distribution of an infrared-ray radiation amount in a moving direction is a unimodal distribution in a first direction and plural infrared images shot by sequentially moving the marker in a second direction different from the first direction, a position of the marker at which a pixel value is maximized, for each pixel, and a calibration processor that calculates a camera parameter by using the position of the marker detected by the peak detector for each pixel.

In this technology, from plural infrared images shot at respective movement positions by sequentially moving a marker whose distribution of an infrared-ray radiation amount in a moving direction is a unimodal distribution in a first direction (e.g., a horizontal direction) and plural infrared images shot at respective movement positions by sequentially moving the marker in a second direction different from the first direction (e.g., a vertical direction orthogonal to the first direction), a position of the marker at which a pixel value is maximized is detected for each pixel. Note that the first direction and the second direction are orthogonal to an optical axis of an infrared camera that shoots the marker. In the infrared images, the marker is shot with a width more than or equal to one pixel in the moving direction. The peak detector detects the position of the marker at which the pixel value is maximized, with higher accuracy than movement intervals of the marker, by interpolation processing using pixel values of plural infrared images in which positions of the marker are different.

The calibration processor calculates the camera parameter by using the position of the marker detected for each pixel and a distance from the infrared camera that shot the infrared images to the marker. Further, the marker is configured with plural markers whose distances from the infrared camera that shot the infrared images are different. The peak detector detects the position in which the pixel value is maximized, for each of the plural markers, by using the infrared images that are shot by sequentially moving each of the plural markers in the first direction and the infrared images that are shot by sequentially moving each of the plural markers in the second direction. The calibration processor calculates the camera parameter by using the position of the marker detected for each pixel and for each of the plural markers and a distance between the plural markers.

A second aspect of this technology is a calibration method including causing a peak detector to detect, from plural infrared images shot by sequentially moving a marker whose distribution of an infrared-ray radiation amount in a moving direction is a unimodal distribution in a first direction and plural infrared images shot by sequentially moving the marker in a second direction different from the first direction, a position of the marker at which a pixel value is maximized, for each pixel, and causing a calibration processor to calculate a camera parameter by using the position of the marker detected by the peak detector for each pixel.

A third aspect of this technology is a calibration chart device including a marker whose distribution of an infrared-ray radiation amount in a moving direction is a unimodal distribution, and a driving controller that moves the marker in a first direction and a second direction different from the first direction.

In this technology, for example, the first direction and the second direction are orthogonal to each other, and the first direction and the second direction are orthogonal to an optical axis of an infrared camera that shoots the marker. The marker may be provided in plural numbers in a direction orthogonal to the first direction and the second direction with a predetermined interval left. Further, the markers may be configured with a marker that is moved in the first direction and a marker that is moved in the second direction. Furthermore, plural markers including the marker that is moved in the first direction and the marker that is moved in the second direction may be provided with different distances from the infrared camera that shoots the markers. Each of the markers is shot with a width more than or equal to one pixel of the infrared camera in the moving direction.

Advantageous Effect of Invention

According to this technology, a peak detector detects, from plural infrared images shot by sequentially moving a marker whose distribution of an infrared-ray radiation amount in a moving direction is a unimodal distribution in a first direction and plural infrared images shot by sequentially moving the marker in a second direction different from the first direction, a position of the marker at which a pixel value is maximized, for each pixel, and a calibration processor calculates a camera parameter by using the position of the marker detected by the peak detector for each pixel. Therefore, calibration of an infrared camera can be performed with ease. Note that the effect described in the present specification is illustrative in nature and is not limited, and additional effects may be provided.

DESCRIPTION OF EMBODIMENTS

Figure 1:
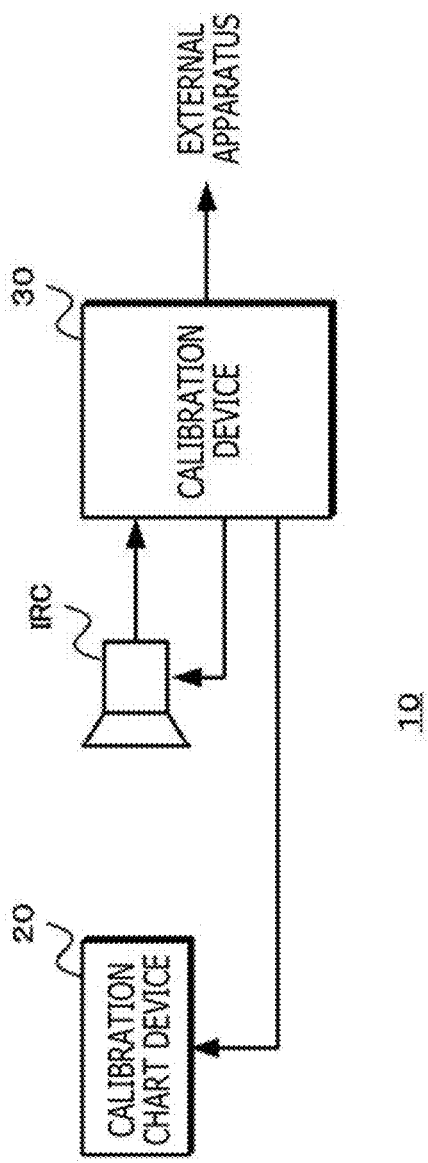
FIG. 1 is a diagram illustrating a configuration of a calibration system.

Hereinafter, exemplary embodiments of the present technology will be described. Note that the description will be made in the following order.
1. Configuration of calibration system
2. First exemplary embodiment
  2-1. Configuration of calibration chart device
  2-2. Configuration of calibration device
  2-3. Operation of calibration device
3. Second exemplary embodiment
  3-1. Configuration of calibration chart device
  3-2. Configuration of calibration device
  3-3. Operation of calibration device
4. Other exemplary embodiments
5. Application example 1. Configuration of Calibration System FIG. 1 is a diagram illustrating a configuration of a calibration system. A calibration system 10 includes a calibration chart device 20 and a calibration device 30.

The calibration chart device 20 includes a marker configured such that a distribution of an infrared-ray radiation amount in a moving direction is a unimodal distribution and a driving controller that separately moves the marker in a first direction and a second direction different from the first direction. Note that, in the following description, the first direction is defined as a horizontal direction and the second direction is defined as a vertical direction, and therefore, the marker is moved in a two-dimensional direction. The calibration device 30 detects a position of the marker at which a pixel value is maximized, for each pixel, from plural infrared images shot by sequentially moving the marker in the first direction and plural infrared images shot by sequentially moving the marker in the second direction and calculates camera parameters such as internal parameters or the internal parameters and external parameters by using the position of the marker detected for each pixel. The calibration device 30 outputs the calculated camera parameters to, for example, an external apparatus that performs image processing such as recognition using the infrared images obtained by an infrared-ray camera IRC.

2. First Exemplary Embodiment

Figure 2:
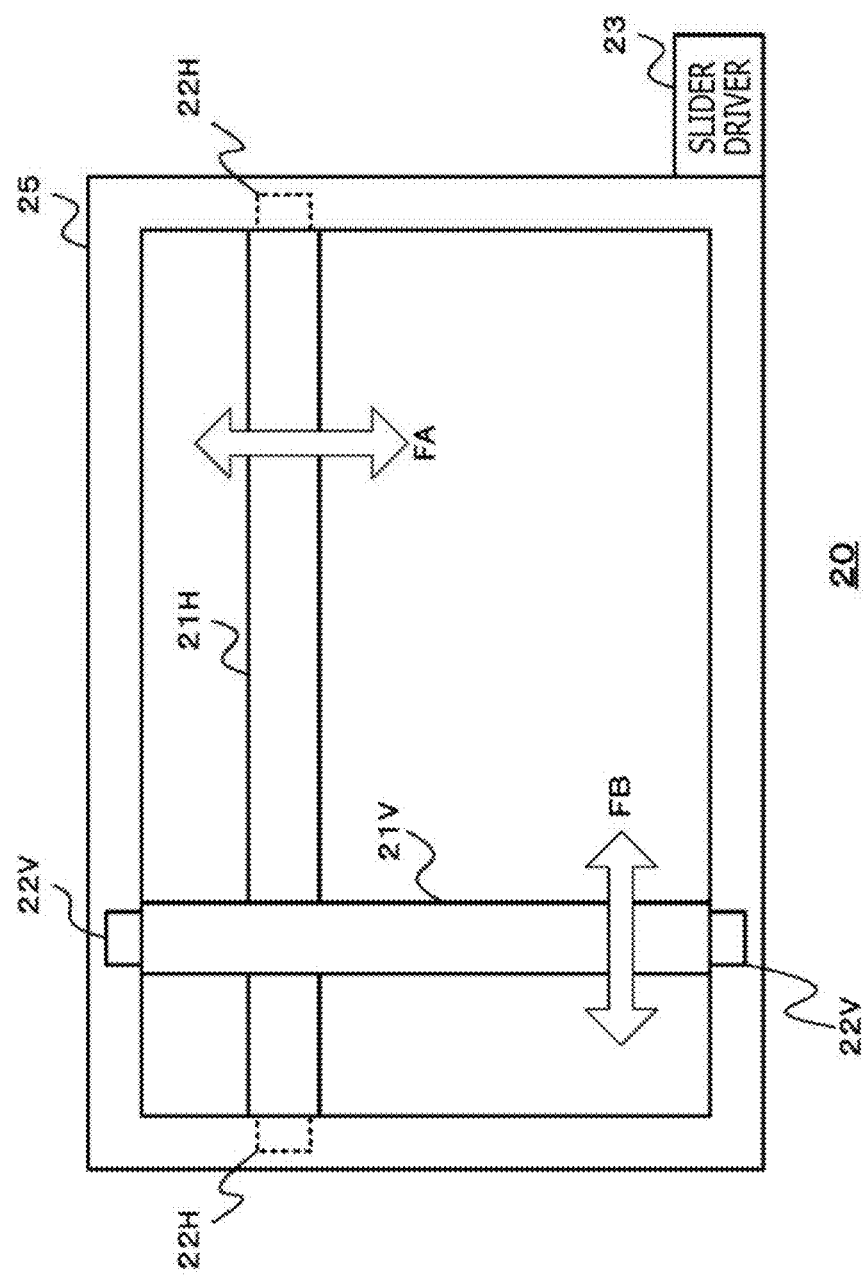
FIG. 2 is a diagram illustrating a configuration of a calibration chart device.

<2-1. Configuration of Calibration Chart Device>
FIG. 2 illustrates a configuration of a calibration chart device according to a first exemplary embodiment. A calibration chart device 20 includes a horizontal marker 21H, a vertical marker 21V, a horizontal marker slider 22H, a vertical marker slider 22V, a slider driver 23, and a frame 25, for example.

In the horizontal marker 21H, a longitudinal direction is defined as the horizontal direction and ends in the longitudinal direction are attached to the horizontal marker slider 22H. The horizontal marker slider 22H is provided to the frame 25 in a vertically movable manner. Accordingly, the horizontal marker 21H is held by the frame 25 so as to be movable in the vertical direction (in a direction indicated by an arrow FA).

In the vertical marker 21V, a longitudinal direction is defined as the vertical direction and ends in the vertical direction are attached to the vertical marker slider 22V. The vertical marker slider 22V is provided to the frame 25 in a horizontally movable manner. Accordingly, the vertical marker 21V is held by the frame 25 so as to be movable in the horizontal direction (in a direction indicated by an arrow FB) orthogonal to the moving direction of the horizontal marker 21H.

The slider driver 23 drives the horizontal marker slider 22H or the vertical marker slider 22V, based on a control signal from a calibration device 30. The slider driver 23 drives the horizontal marker slider 22H to move the horizontal marker 21H in the vertical direction (the direction indicated the arrow FA). The slider driver 23 also drives the vertical marker slider 22V to move the vertical marker 21V in the horizontal direction (the direction indicated the arrow FB).

Figure 3A:
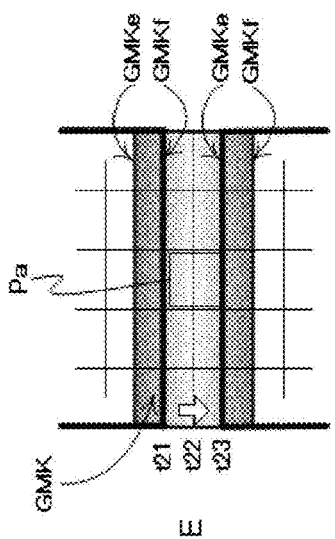
FIGS. 3A, 3B, 3C, 3D, 3E, and 3F are view illustrating a case where an infrared camera IRC shoots a horizontal marker 21H.
Figure 3C:
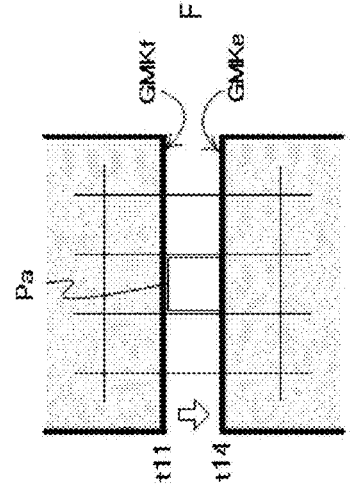
Figure 3E:
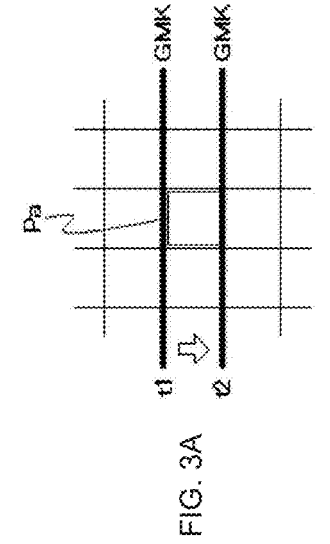
Figure 3B:
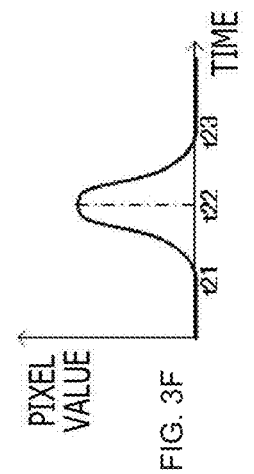

FIGS. 3A, 3B, 3C, 3D, 3E, and 3F illustrate a case where the horizontal marker 21H is moved in the vertical direction by the horizontal marker slider 22H and an infrared camera IRC shoots the horizontal marker 21H. FIG. 3A illustrates a case where the horizontal marker 21H is a rectilinear heating body and is thinner than a pixel. In this case, when the marker moves and an infrared image GMK of the marker reaches a position of a pixel Pa at a time point t1, a pixel value of the pixel Pa increases as illustrated in FIG. 3B. During a period in which the infrared image GMK of the marker moves in the pixel until a time point t2, the pixel value of the pixel Pa is constant. When the infrared image GMK of the marker then deviates from the position of the pixel Pa at the time point t2, the pixel value of the pixel Pa decreases. In this manner, when the infrared image of the marker moves in the pixel, the pixel value is constant. Therefore, it is difficult to accurately measure the position of the marker present at a center of the pixel.

Figure 3D:
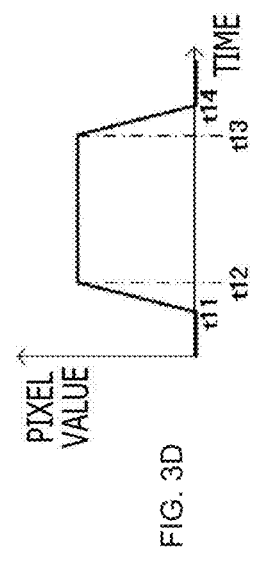

FIG. 3C illustrates a case where the horizontal marker 21H is a belt-shaped heating body and is thicker than the pixel. Note that, to simplify the description, an infrared-ray radiation amount from the marker (belt-shaped heating body) is assumed to be constant at any position. In this case, during a period in which the marker moves, a front edge GMKf of the infrared image of the marker reaches the position of the pixel Pa at a time point t11, and then, the front edge GMKf passes the position of the pixel Pa at a time point t12, the pixel value of the pixel Pa increases in association with the movement of the marker as illustrated in FIG. 3D. During a period in which the front edge GMKf passes the position of the pixel Pa at the time point t12 and a back edge GMKb then reaches the position of the pixel Pa at a time point t13, the pixel value of the pixel Pa is constant even when the marker moves. Thereafter, during a period in which the back edge GMKb reaches the position of the pixel Pa at the time point t13 and the back edge GMKb passes the position of the pixel Pa at a time point t14, the pixel value of the pixel Pa decreases in association with the movement of the marker. In this manner, during the period in which the pixel is at the position in the infrared image of the marker, the pixel value is constant. Therefore, it is difficult to accurately measure the position of the marker present at the center of the pixel.

In view of this situation, in this technology, a distribution of an infrared-ray radiation amount in the vertical direction that is the moving direction of the horizontal marker 21H is made to be a unimodal distribution, that is, a distribution in which a peak position is provided and the infrared-ray radiation amount decreases while in association with separation from the peak position. Note that, to simplify the description, in the distribution of the infrared-ray radiation amount from the horizontal marker 21H, it is assumed that a portion above the peak position and a portion below the peak position are symmetrical with each other, the peak position serving as a symmetric axis.

Figure 3F:
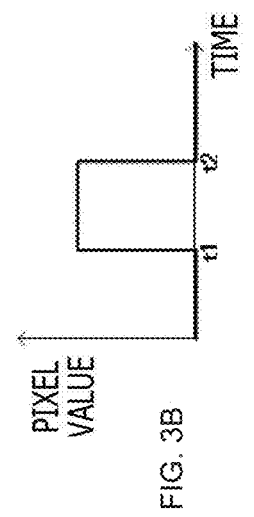

FIG. 3E illustrates a case where the distribution of the infrared-ray radiation amount of the horizontal marker 21H in the vertical direction is made to be the unimodal distribution. Note that, in the infrared image GMK of the marker, a darker portion indicates a decreased infrared-ray radiation amount and a brighter portion indicates an increased infrared-ray radiation amount in FIG. 3E. Further, the infrared image GMK of the marker has a width in the moving direction that is more than or equal to one pixel of the infrared camera. In this case, when the marker moves and the front edge GMKf of the infrared image of the marker passes the position of the pixel Pa at a time point t21, the pixel value of the pixel Pa increases in association with the movement of the marker as illustrated in FIG. 3F. The pixel value of the pixel Pa then increases until a time point t22 when the peak position of the infrared-ray radiation amount (indicated by a broken line) is located at the center of the pixel, and the pixel value of the pixel Pa decreases when the peak position passes the center of the pixel Pa. Moreover, until the back edge GMKb of the infrared image of the marker passes the position of the pixel Pa at a time point t23, the pixel value of the pixel Pa decreases in association with the movement of the marker. In this manner, when the peak position at which infrared-ray radiation amount is maximum is located at the center of the pixel, the pixel value becomes maximum. Accordingly, the distribution of the infrared-ray radiation amount in the moving direction of the marker is made to be the unimodal distribution, and when the infrared camera shoots the marker, the width in the moving direction of the infrared image indicating the marker is made to be more than or equal to one pixel. When the marker is configured in this manner, a predetermined position (the peak position at which infrared-ray radiation amount is maximum) of the marker relative to the pixel Pa can accurately be measured.

Figure 4:
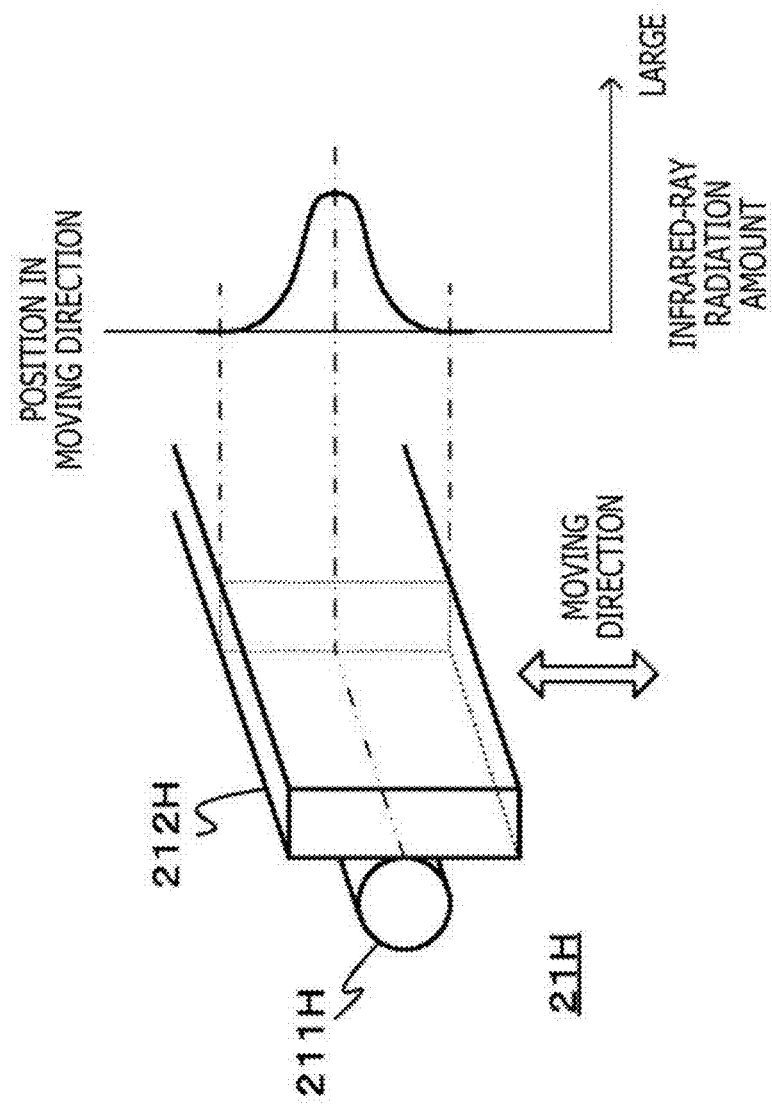
FIG. 4 is a view illustrating a configuration of the horizontal marker.

In each of the horizontal marker 21H and the vertical marker 21V, the distribution of the infrared-ray radiation amount in the moving direction is made to be the unimodal distribution. FIG. 4 illustrates a configuration of the horizontal marker. The horizontal marker 21H is configured with, for example, a rectilinear heating body 211H and a diffuser 212H, and the rectilinear heating body 211H is fixed to the diffuser 212H with its longitudinal direction being defined as the horizontal direction. In a case where the rectilinear heating body 211H is fixed to the diffuser 212H in this manner, a temperature distribution of a surface opposite to an attachment surface of the rectilinear heating body (hereinafter, referred to as a "shooting surface") causes a temperature gradient as indicated by an expression (1)

according to the Fourier's law. Note that, in the expression (1), "J" indicates a thermal flux, "dT/dx" indicates the temperature gradient, and "λ" indicates thermal conductivity. Further, it has been known that the infrared-ray radiation amount is proportional to the fourth power of absolute temperature, and therefore, the infrared-ray radiation amount varies according to the temperature gradient. In other words, the distribution of the infrared-ray radiation amount in the vertical direction is made to be the unimodal distribution.

$$J=-\lambda(dT/dx) \quad (1)$$

The vertical marker 21V is configured similarly to the horizontal marker 21H and is directed along the vertical direction such that the horizontal marker 21H is rotated by 90 degrees.

The horizontal marker 21H and the vertical marker 21V of the calibration chart device 20 configured as illustrated in FIG. 2 are shot, by the infrared camera IRC, for each movement position of the horizontal marker 21H in the vertical direction and for each movement position of the horizontal marker 21H in the vertical direction. Further, plural infrared images shot by the infrared camera IRC are output to the calibration device 30. Moreover, the infrared camera IRC is installed in front of the calibration chart device 20, for example, and the moving directions of the horizontal marker 21H and the vertical marker 21V are set to be orthogonal to an optical axis of the infrared camera IRC. Furthermore, the infrared camera IRC shoots the horizontal marker 21H and the vertical marker 21V such that the widths of the infrared image indicating the horizontal marker 21H and the infrared image indicating the vertical marker 21V in the respective moving directions are made to be more than or equal to one pixel.

<2-2. Configuration of Calibration Device>

Figure 5:
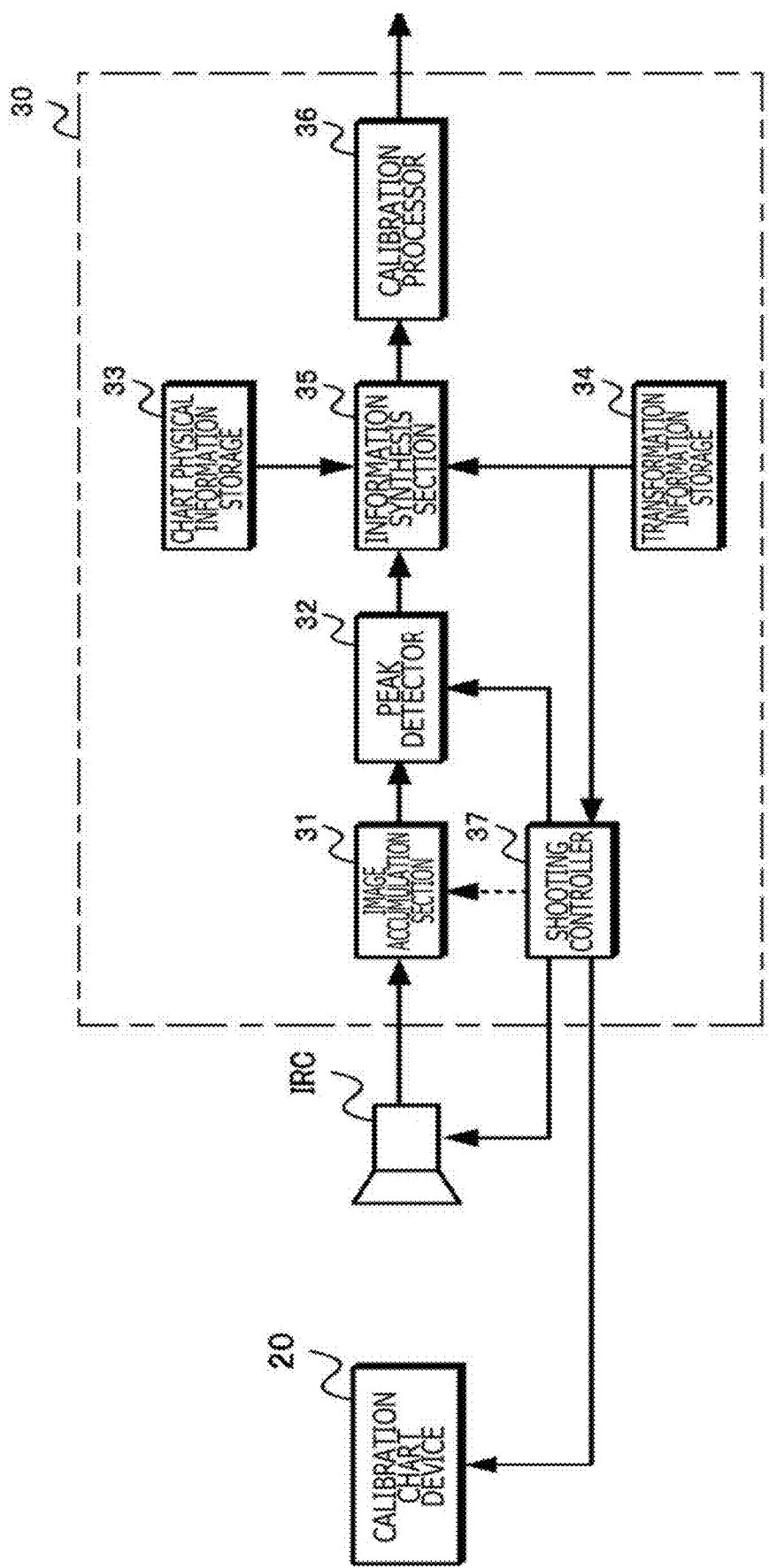
FIG. 5 is a diagram illustrating a configuration of a calibration device.

FIG. 5 illustrates a configuration of the calibration device. The calibration device associates count values with positions of the horizontal marker 21H and the vertical marker 21V, for example, and controls positional movement of the horizontal marker 21H and the vertical marker 21V, based on the count values.

The calibration device 30 includes an image accumulation section 31, a peak detector 32, a chart physical information storage 33, a transformation information storage 34, an information synthesis section 35, a calibration processor 36, and a shooting controller 37.

The image accumulation section 31 can accumulate the plural infrared images obtained by the infrared camera IRC.

The peak detector 32 detects positions of the horizontal marker 21H and the vertical marker 21V at which the infrared-ray radiation amount becomes a peak, for each pixel, from the infrared image group accumulated in the image accumulation section 31. The peak detector 32 performs, for example, interpolation processing using pixel values of corresponding pixel positions in the infrared image group for each pixel to detect the count values of the horizontal marker 21H and the vertical marker 21V in which the pixel value becomes the peak. The peak detector 32 generates a peak counter matrix indicating, for each pixel, count values in which the pixel value becomes the peak, taking the detected count values as information regarding a corresponding pixel position in the peak counter matrix. The peak detector 32 outputs the generated peak counter matrix to the information synthesis section 35.

The chart physical information storage 33 stores physical information regarding the calibration chart device 20, for example, distance information indicating a distance from the infrared camera IRC to the calibration chart device 20.

The transformation information storage 34 stores transformation information (e.g., transformation table) for transforming the count values to positions. In the transformation information, a position in the vertical direction corresponding to the count value of the horizontal marker 21H is indicated and a position in the horizontal direction corresponding to the count value of the vertical marker 21V is indicated.

The information synthesis section 35 transforms the count values for each pixel indicated in the peak counter matrix to the positions of the markers, based on the transformation table stored in the transformation information storage 34. Further, the information synthesis section 35 obtains the physical information stored in the chart physical information storage 33 and outputs chart position information indicating, for each pixel, positions of the horizontal marker 21H and the vertical marker 21V at which the infrared-ray radiation amount becomes a peak and the physical information to the calibration processor 36.

The calibration processor 36 calculates the internal parameters of the infrared camera IRC, based on the chart position information and the physical information output from the information synthesis section 35. A relation between the pixel position in the infrared image and a three-dimensional position of the marker is clarified from the chart position information and the physical information. Accordingly, the calibration processor 36 can calculate the internal parameters by performing processing similar to that disclosed in PTL 1.

The shooting controller 37 performs movement control of the horizontal marker 21H and the vertical marker 21V in the calibration chart device 20 and shooting operation control of the infrared camera IRC. The shooting controller 37 further controls the infrared camera IRC or the image accumulation section 31 to associate the infrared image with the count values of the horizontal marker 21H and the vertical marker 21V. Furthermore, when the predetermined number of infrared images are accumulated in the image accumulation section 31, the shooting controller 37 starts an operation of the peak detector 32 to cause the peak detector 32 to detect the count values of the horizontal marker 21H and the vertical marker 21V in which the pixel value is maximized, for each image.

<2-3. Calibration Operation>

Figure 6:
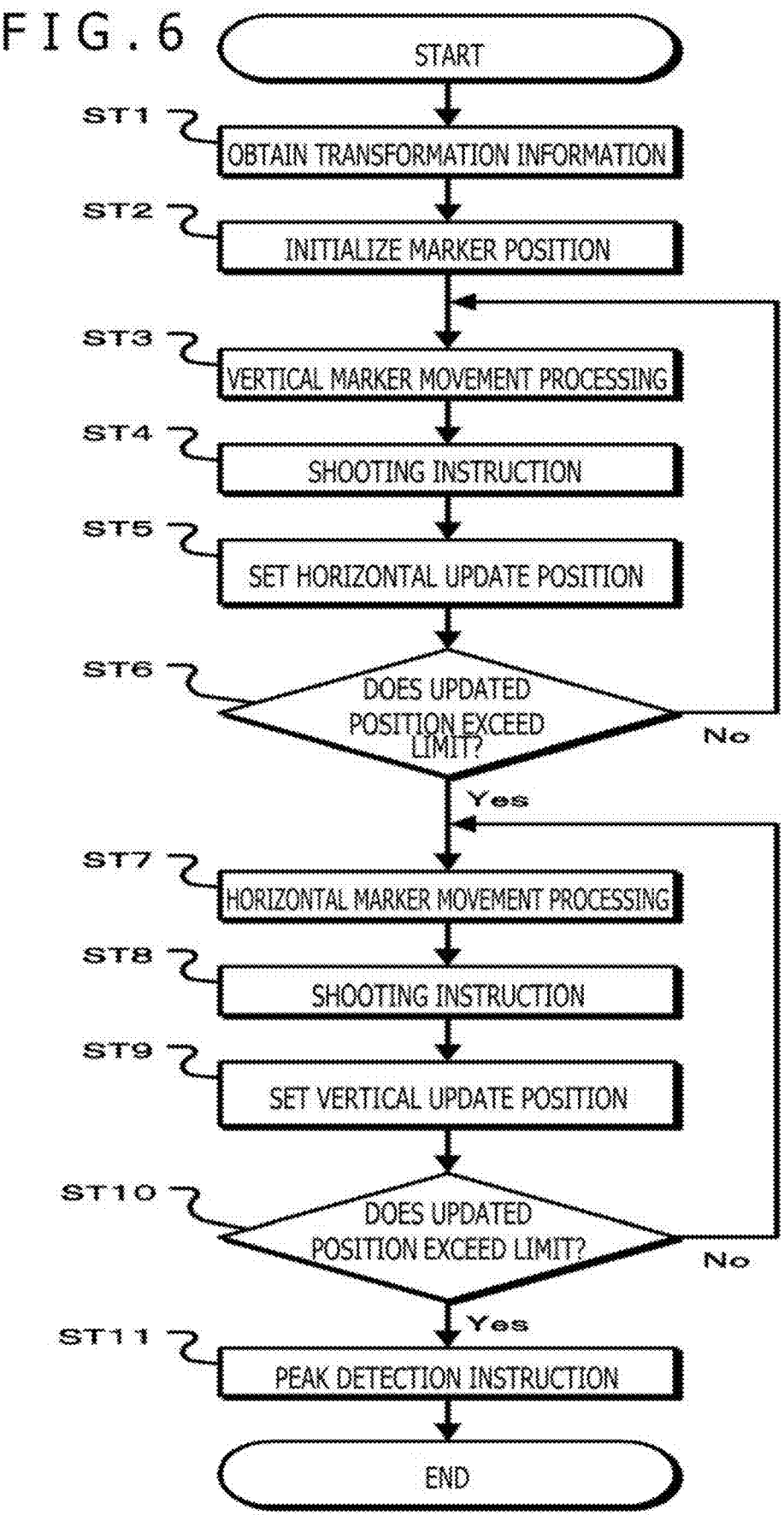
FIG. 6 is a flowchart illustrating an operation of a shooting controller.

Next, a calibration operation will be described. FIG. 6 is a flowchart illustrating an operation of the shooting controller in the calibration device.

The shooting controller obtains the transformation information in step ST1. The shooting controller 37 obtains the transformation information (transformation table) that transforms the count value to the position of the marker from the transformation information storage 34 and proceeds to step ST2.

The shooting controller initializes the positions of the markers in step ST2. The shooting controller 37 causes each of count values of the horizontal marker 21H and the vertical marker 21V to be "0," for example. Further, the shooting controller 37 transforms the count values to the position information, based on the transformation information, sets an initial position of the horizontal marker 21H in the vertical direction and an initial position of the vertical marker 21V in the horizontal direction, and proceeds to step ST3.

The shooting controller performs vertical marker movement processing in step ST3. The shooting controller 37 controls the calibration chart device 20 to move the vertical marker 21V to the set horizontal position and proceeds to step ST4.

The shooting controller gives shooting instruction in step ST4. The shooting controller 37 outputs the shooting instruction to the infrared camera IRC to obtain one frame of the infrared image in which the calibration chart device 20 is shot and proceeds to step ST5.

The shooting controller sets a horizontal update position in step ST5. The shooting controller 37 adds a predetermined amount to the count value of the vertical marker 21V to newly set a horizontal position of the vertical marker 21V and proceeds to step ST6.

The shooting controller determines whether the updated position exceeds a limit in step ST6. The shooting controller 37 returns to step ST3 in a case where the updated position set in step ST5 does not exceed a horizontal movement range of the vertical marker 21V or proceeds to step ST7 in a case where the updated position exceeds the horizontal movement range.

The shooting controller performs horizontal marker movement processing in step ST7. The shooting controller 37 controls the calibration chart device 20 to move the horizontal marker 21H to the set vertical position and proceeds to step ST8.

The shooting controller gives shooting instruction in step ST8. The shooting controller 37 outputs the shooting instruction to the infrared camera IRC to obtain one frame of the infrared image in which the calibration chart device 20 is shot and proceeds to step ST9.

The shooting controller sets a vertical update position in step ST9. The shooting controller 37 adds a predetermined amount to the count value of the horizontal marker 21H to newly set a vertical position of the horizontal marker 21H and proceeds to step ST10.

The shooting controller determines whether the updated position exceeds a limit in step ST10. The shooting controller 37 returns to step ST7 in a case where the updated position set in step ST9 does not exceed a vertical movement range of the horizontal marker 21H or proceeds to step ST11 in a case where the updated position exceeds the vertical movement range.

The shooting controller gives peak detection instruction in step ST11. When processing in step ST1 to step ST10 is performed, the vertical marker 21V is sequentially moved in the horizontal direction within the horizontal movement range, and the infrared camera IRC obtains the infrared image shot at each movement position, while the horizontal marker 21H is sequentially moved in the vertical direction within the vertical movement range, and the infrared camera IRC obtains the infrared image shot at each movement position. Therefore, the shooting controller 37 performs operation-control for causing the peak detector 32 to detect the positions of the horizontal marker 21H and the vertical marker 21V at which the pixel value becomes the peak, at each pixel position, based on the infrared images thus obtained. Note that each of the infrared images is associated with the count values of the horizontal marker 21H and the vertical marker 21V.

Figure 7:
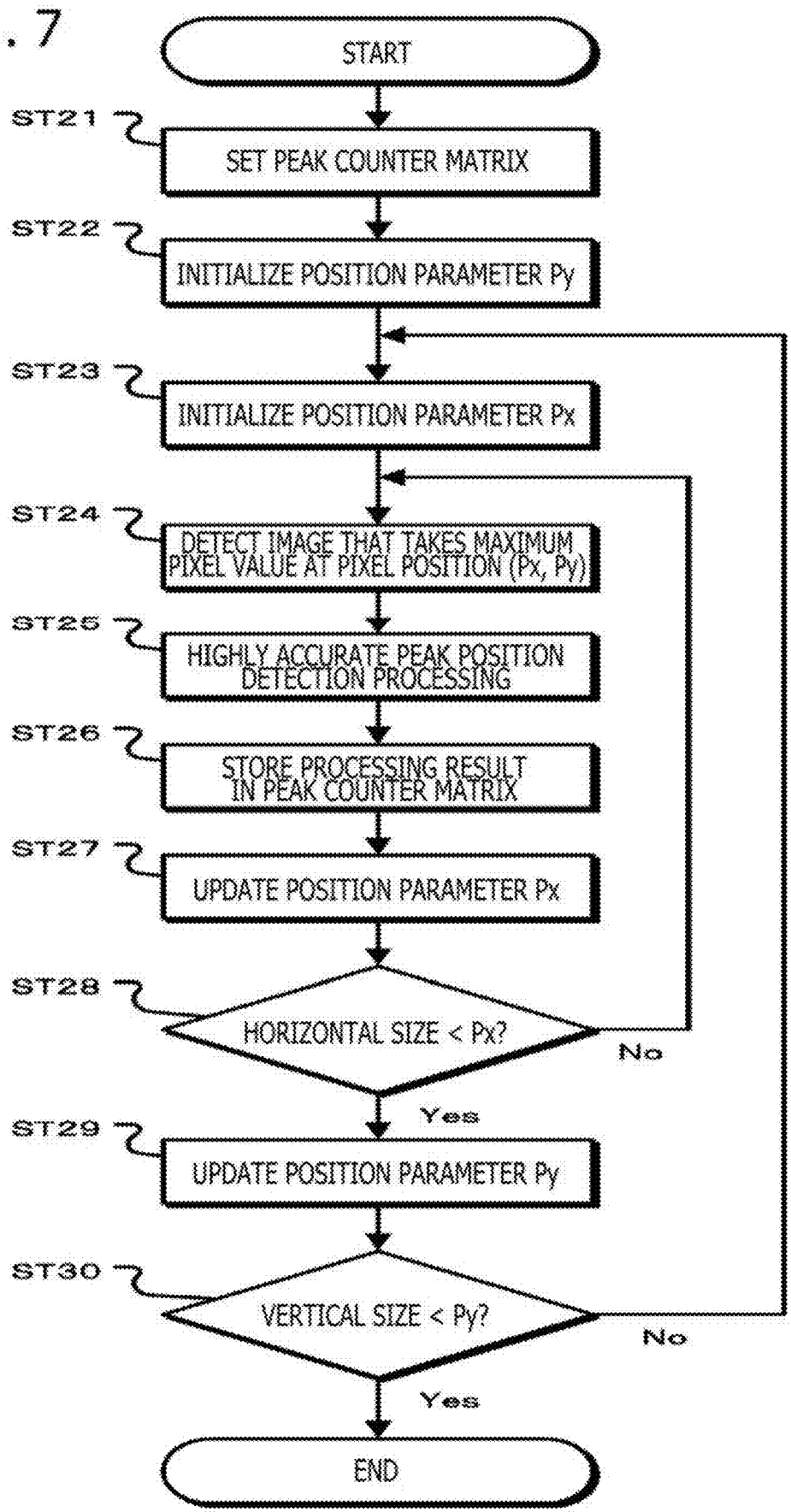
FIG. 7 is a flowchart illustrating an operation of a peak detector.

Next, an operation of the peak detector will be described. FIG. 7 is a flowchart illustrating the operation of the peak detector in the calibration device.

The peak detector sets the peak counter matrix in step ST21. The peak detector 32 provides the peak counter matrix having a size corresponding to the pixel numbers in the horizontal and vertical directions of each of the infrared images obtained by the infrared camera IRC and proceeds to step ST22.

The peak detector initializes a position parameter Py indicating a vertical pixel position in step ST22. The peak detector 32 sets an initial position of the position parameter Py indicating a pixel position in the vertical direction to be "0" and proceeds to step ST23.

The peak detector initializes a position parameter Px indicating a horizontal pixel position in step ST23. The peak detector 32 sets an initial position of the position parameter Px indicating a pixel position in the horizontal direction to be "0" and proceeds to step ST24.

The peak detector detects an image that takes the maximum pixel value at a pixel position (Px, Py), in step ST24. The peak detector 32 detects an image FHmax in which a pixel value of the pixel position (Px, Py) is maximized from the infrared images obtained while the vertical marker 21V is moved in the horizontal direction. Further, the peak detector 32 detects an image FVmax in which the pixel value of the pixel position (Px, Py) is maximized from the infrared images obtained while the horizontal marker 21H is moved in the vertical direction and proceeds to step ST25.

The peak detector performs highly accurate peak position detection processing in step ST25. The peak detector 32 performs the highly accurate peak position detection processing to detect the count value of the horizontal marker 21H and the count value of the vertical marker 21V in which the pixel value is maximized, more minutely than a movement unit of the markers. The peak detector performs interpolation processing, for example, parabola-fitting processing, as the highly accurate peak position detection processing. Note that the highly accurate peak position detection processing is not limited to the parabola-fitting processing and equiangular straight-line fitting processing can also be used, for example. However, in a case where a change in infrared-ray radiation amount near the peak position is close to a quadratic function, the parabola-fitting processing is preferably used.

Figure 8:
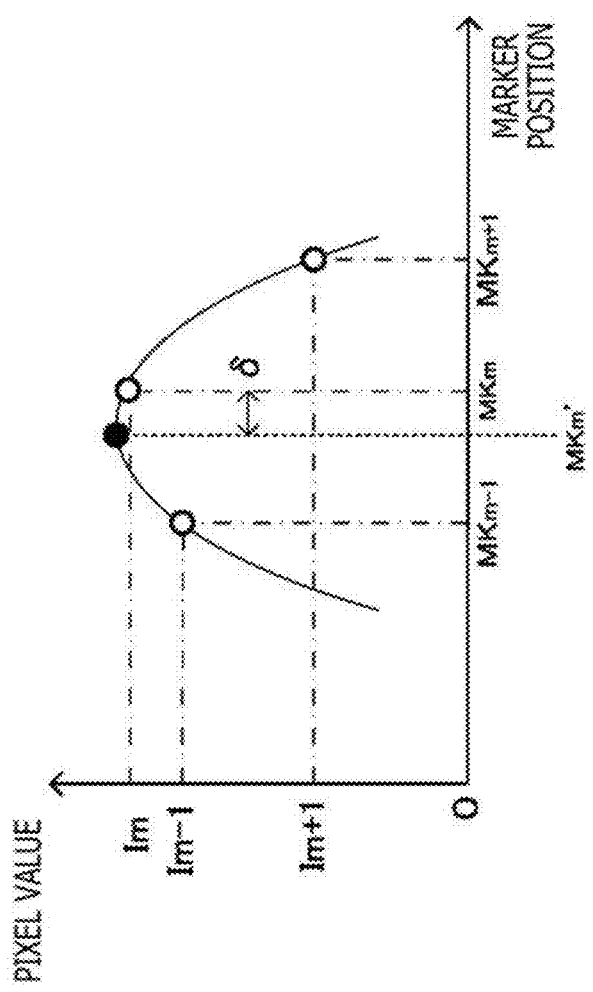
FIG. 8 is a view explaining parabola-fitting processing.

FIG. 8 is a view illustrating the parabola-fitting processing. The peak detector 32 obtains pixel values of the pixel position (Px, Py) from the image FHmax in which the pixel value is maximum, an image FHmax−1 in which the vertical marker 21V is located at a position immediately before the image FHmax, and an image FHmax+1 in which the vertical marker 21V is located at a position immediately after the image FHmax to perform the parabola-fitting processing. Note that it is assumed that the pixel values of the pixel position (Px, Py) are a pixel value Im for the image FHmax, a pixel value Im−1 for the image FHmax−1, and a pixel value Im+1 for the image FHmax+1. It is also assumed that the marker position of the image FHmax has a count value MKm, the marker position of the image FHmax−1 has a count value MKm−1, and the marker position of the image FHmax+1 has a count value MKm+1. Furthermore, an interval between the count value MKm−1 and the count value MKm and an interval between the count value MKm and the count value MKm+1 are set to be the predetermined amount as described above, whereby those intervals are equal to each other.

The peak detector 32 performs an arithmetic operation of an expression (2) to calculate a peak position error δ that is a difference between the marker position at which the pixel value is maximized and the count value MKm indicating the marker position of the image FHmax.

$$\delta = (Im-1 - Im+1)/(2 \times Im-1 - 4 \times Im + 2 \times Im+1) \quad (2)$$

Furthermore, the peak detector 32 stores a count value MKm' of the marker position that has the peak position error δ relative to the count value MKm indicating the marker position of the image FHmax, at a position, in the peak counter matrix, corresponding to the pixel position (Px, Py). In other words, the count value in which the pixel value is maximized when the vertical marker 21V is horizontally moved is stored at the position, in the peak counter matrix, corresponding to the pixel position (Px, Py). Note that the count value MKm' at the marker position that has the peak position error δ can be calculated based on an expression (3). When such processing is performed for each pixel position, a relation between the pixel and the horizontal position can be clarified.

$$MKm'=(MKm+1-MKm-1)/2\times\delta+MKm \qquad (3)$$

The peak detector 32 performs similar processing using an image FVmax in which the pixel value at the pixel position (Px, Py) is maximized from the infrared images obtained while the horizontal marker 21H is moved vertically. In other words, the peak detector 32 stores the count value MKm' at the marker position that has the peak position error δ relative to the count value MKm indicating the marker position of the image FVmax at the position, in the peak counter matrix, corresponding to the pixel position (Px, Py). Accordingly, the count value in which the pixel value is maximized when the horizontal marker 21H is vertically moved is stored at the position, in the peak counter matrix, corresponding to the pixel position (Px, Py). When such processing is performed for each pixel position, a relation between the pixel and the vertical position can be clarified. The peak detector 32 detects, for each pixel, the count value indicating the horizontal position of the vertical marker at which the pixel value is maximized and the count value indicating the vertical position of the horizontal marker at which the pixel value is maximized and proceeds to step ST26.

The peak detector stores the processing result in the peak counter matrix in step ST26. The peak detector 32 stores the count values detected in step ST25 at a corresponding position in the peak counter matrix and proceeds to step ST27.

The peak detector updates the position parameter Px indicating the pixel position, in step ST27. The peak detector adds "1" to the position parameter Px to provide a new position parameter Px and proceeds to step ST28.

The peak detector determines whether the position indicated by the position parameter Px exceeds the horizontal size of the image, in step ST28. In a case where the peak detector 32 determines that the position indicated by the position parameter Px does not exceed the horizontal size of the image, the peak detector 32 returns to step ST24, and in a case where the position indicated by the position parameter Px exceeds the horizontal size of the image, the peak detector 32 proceeds to step ST29.

The peak detector updates the position parameter Py indicating the pixel position, in step ST29. The peak detector adds "1" to the position parameter Py to provide a new position parameter Py and proceeds to step ST30.

The peak detector determines whether the position indicated by the position parameter Py exceeds the vertical size of the image, in step ST30. In a case where the peak detector 32 determines that the position indicated by the position parameter Py does not exceed the vertical size of the image, the peak detector 32 returns to step ST23, and in a case where the position indicated by the position parameter Py exceeds the vertical size of the image, the peak detector 32 terminates the peak detection processing.

When the peak detector 32 performs the above-described processing, the count value in which the pixel value in the horizontal direction is maximized and the count value in which the pixel value in the vertical direction is maximized are indicated for each pixel, in the peak counter matrix.

The information synthesis section 35 uses the transformation information stored in the transformation information storage 34 to change the count values that are generated by the peak detector 32 and indicated in the peak counter matrix to the position. The information synthesis section 35 further generates chart position information indicating whether each pixel is the pixel corresponding to the position of the horizontal marker 21H or the position of the vertical marker 21V. The information synthesis section 35 then outputs the generated chart position information and the physical information obtained from the chart physical information storage 33 to the calibration processor 36.

The calibration processor 36 calculates the camera parameters, based on the chart position information and the physical information. Here, a correspondence relation between the pixel in the infrared image and the position of the marker in the calibration chart device 20 is clarified from the chart position information over the whole image. A distance between the infrared camera IRC and the calibration chart device 20 is also clarified from the physical information. In other words, three-dimensional positions corresponding to all pixels are obtained. Accordingly, the calibration processor 36 calculates the internal parameters of the infrared camera IRC by performing the processing similar to that disclosed in NPL 1 described above. Note that a positional relation between the infrared camera IRC and the calibration chart device 20, that is, the external parameter, is assumed to be clarified.

According to the first exemplary embodiment described above, the infrared images are obtained while the markers of the calibration chart device is moved. This enables the calculation of the camera parameters of the infrared camera based on the infrared images thus obtained. Accordingly, the calibration processing can efficiently be performed. In addition, the calibration can be performed with low cost and with ease, without increasing the size of an inspection jig, for example.

3. Second Exemplary Embodiment

In the first exemplary embodiment described above, a case where the external parameter is clarified has been described. In a second exemplary embodiment, a case where the external parameter is not clarified will be described. In the second exemplary embodiment, the camera parameters are calculated using infrared images. The infrared images are shot by having each of plural markers in which distances of the markers from an infrared camera are different and three-dimensional relative positions between the markers are clarified sequentially moved along a first direction and along a second direction.

<3-1. Configuration of Calibration Chart Device>

In the second exemplary embodiment, for the calibration chart device, each of the plural markers in which the distances of the markers from the infrared camera are different and the three-dimensional relative positions between the markers are clarified is movable along the first direction and along the second direction.

Figure 9:
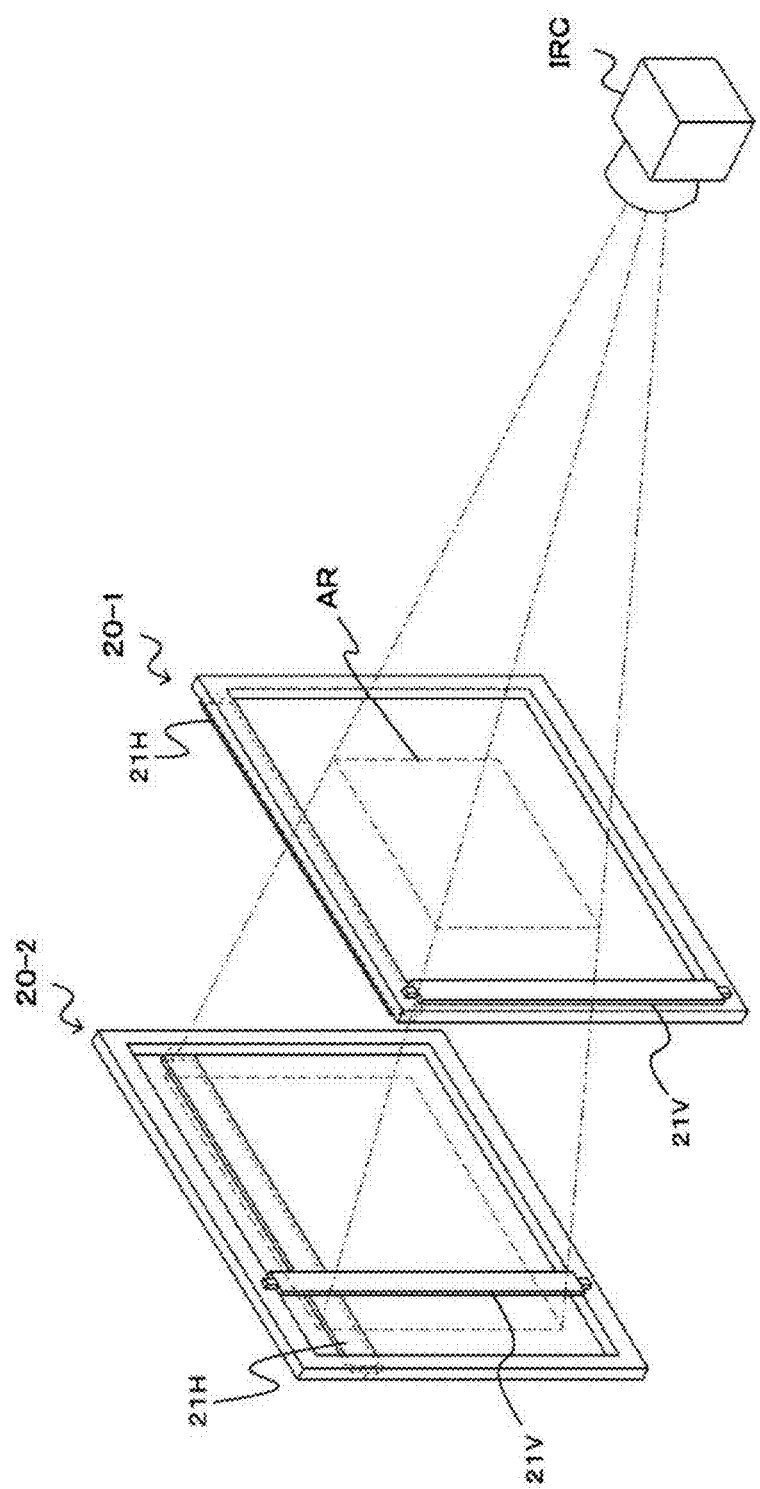
FIG. 9 is a view illustrating a configuration of a calibration chart device.

FIG. 9 illustrates a configuration of the calibration chart device according to the second exemplary embodiment. For example, in the second exemplary embodiment, two calibration chart devices in the first exemplary embodiment are provided along an optical axis direction of the infrared camera IRC with a predetermined interval left. The infrared camera IRC can shoot the markers in each calibration chart device. A calibration chart device 20-1 located closer to the infrared camera IRC and a calibration chart device 20-2 located behind the calibration chart device 20-1 are configured similarly to the calibration chart device 20 in the first exemplary embodiment. In addition, the markers in the calibration chart device 20-1 are movable to positions outside a shooting range AR of the infrared camera IRC, when the calibration chart device 20-2 located on the rear side moves its markers to obtain the infrared images.

<3-2. Configuration of Calibration Device>

Figure 10:
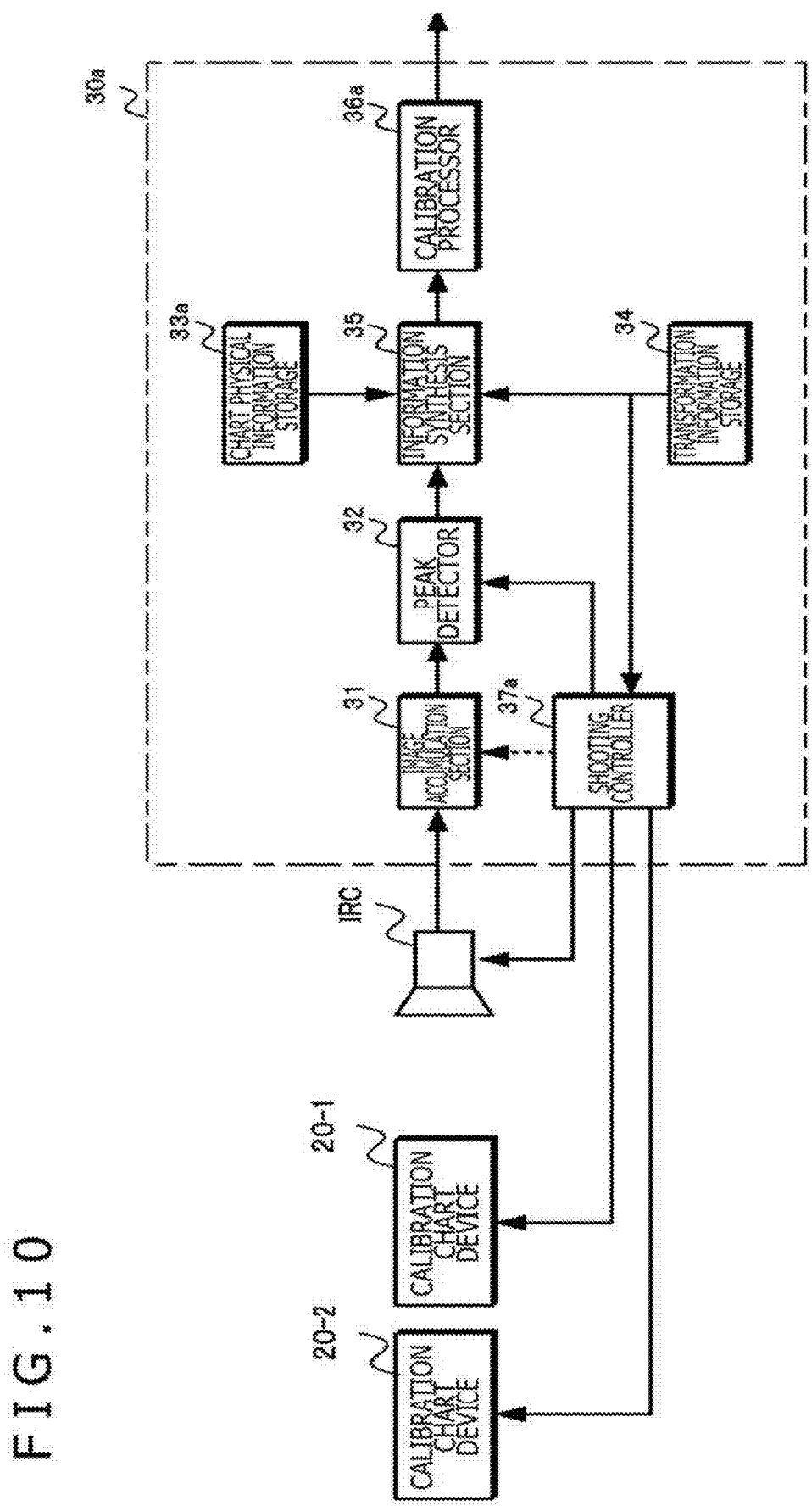
FIG. 10 is a diagram illustrating a configuration of a calibration device.

FIG. 10 illustrates a configuration of a calibration device. A calibration device 30a associates positions of the horizontal marker 21H and the vertical marker 21V with count values, for example, and performs positional movement control of the horizontal marker 21H and the vertical marker 21V of the calibration chart devices 20-1 and 20-2, based on the count values.

The calibration device 30a includes an image accumulation section 31, a peak detector 32, a chart physical information storage 33a, a transformation information storage 34, an information synthesis section 35, a calibration processor 36a, and a shooting controller 37a.

The image accumulation section 31 can accumulate plural infrared images obtained by the infrared camera IRC.

The peak detector 32 detects positions of the horizontal marker 21H and the vertical marker 21V at which an infrared-ray radiation amount becomes a peak for each pixel from the infrared image group stored in the image accumulation section 31 for each of the markers having different distances from the infrared camera (for each of the calibration chart devices). The peak detector 32 performs, for example, interpolation processing using pixel values at corresponding pixel positions in the infrared image group, for each pixel, to detect count values of the horizontal marker 21H and the vertical marker 21V in which the pixel value becomes the peak. The peak detector 32 generates a peak counter matrix indicating the count values in which the pixel value becomes the peak, for each pixel, taking the detected count values as information regarding the corresponding pixel position in the peak counter matrix. The peak detector 32 outputs the generated peak counter matrix to the information synthesis section 35.

The chart physical information storage 33a stores physical information regarding the calibration chart devices, for example, information indicating relative positional relations between the infrared camera IRC and the calibration chart device 20-1 as well as the calibration chart device 20-2.

The transformation information storage 34 stores transformation information (e.g., transformation table) for transforming the count value to a position. In the transformation information, a position in the vertical direction for the count value of the horizontal marker 21H is indicated and a position in the horizontal direction for the count value of the vertical marker 21V is indicated.

The information synthesis section 35 transforms the count values for each pixel indicated in the peak counter matrix to a position of the marker, based on the transformation table stored in the transformation information storage 34. Further, the information synthesis section 35 obtains the physical information stored in the chart physical information storage 33a and outputs chart position information indicating, for each pixel, positions of the horizontal marker 21H and the vertical marker 21V at which the infrared-ray radiation amount becomes the peak and the obtained physical information to the calibration processor 36a.

The calibration processor 36a calculates the internal parameters of the infrared camera IRC and external parameters, based on the chart position information generated by the information synthesis section 35 and the physical information. Here, with the chart position information and the physical information, pixel positions in the infrared images, three-dimensional positions of the markers, and relative positional relations between the markers are clarified. Accordingly, the internal parameters of the infrared camera IRC and the external parameters are calculated by performing processing similar to that disclosed in technical literature "Zhang, Zhengyou. 'A flexible new technique for camera calibration.' IEEE Transactions on pattern analysis and machine intelligence 22.11 (2000): 1330-1334."

The shooting controller 37a performs movement control of the horizontal marker 21H and the vertical marker 21V in each of the calibration chart devices 20-1 and 20-2 and shooting operation control of the infrared camera IRC. The shooting controller 37a further controls the infrared camera IRC or the image accumulation section 31 to associate the infrared image with the count values of the horizontal marker 21H and the vertical marker 21V of each of the calibration chart devices 20-1 and 20-2. Furthermore, when the predetermined number of infrared images are accumulated in the image accumulation section 31, the shooting controller 37a causes the peak detector 32 to detect, for each calibration chart device, the count values of the horizontal marker 21H and the vertical marker 21V in which the pixel value is maximized for each image.

<3-3. Calibration Operation>

Figure 11:
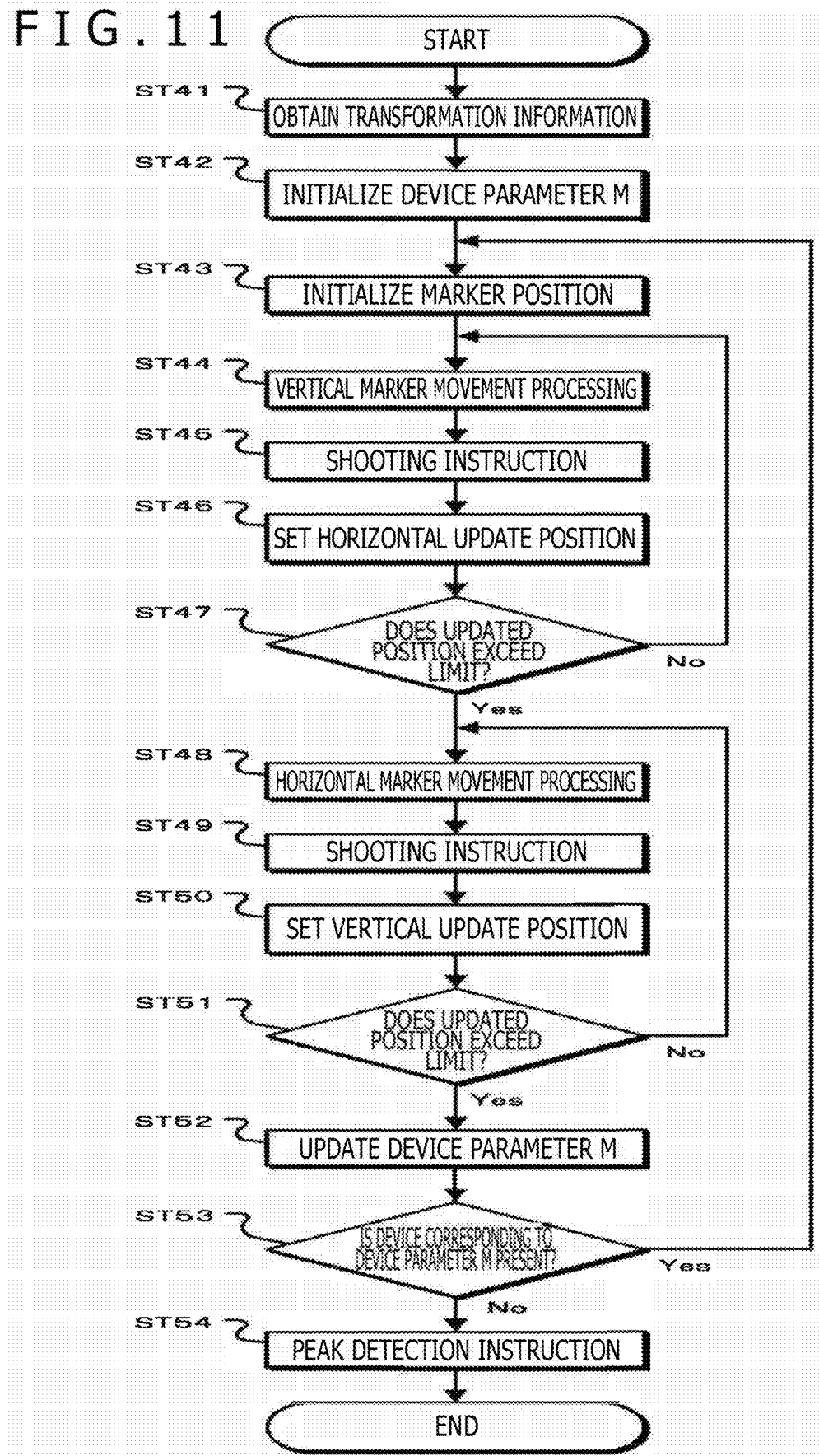
FIG. 11 is a flowchart illustrating an operation of a shooting controller.

Next, an operation of the calibration device will be described. FIG. 11 is a flowchart illustrating an operation of the image-capturing controller in the calibration device.

The shooting controller obtains the transformation information in step ST41. The shooting controller 37a obtains the transformation information that transforms the count values to the positions of the markers from the transformation information storage 34. Note that, in a case where a correspondence relation between the count values and the marker positions is different between the calibration chart device 20-1 and the calibration chart device 20-2, the transformation information storage 34 stores the transformation information for each calibration chart device. The shooting controller 37a obtains the transformation information for each calibration chart device from the transformation information storage 34 and proceeds to step ST42.

The shooting controller initializes a device parameter M in step ST42. In a case where the plural markers whose distances from the infrared camera are different are used in the calibration system, for example, in a case where the plural calibration chart devices are used as described above, the device parameter for distinguishing each calibration chart device is set. For example, in a case where the calibration chart devices 20-1 and 20-2 are used, the calibration chart device 20-1 has a device parameter of "M=1," the calibration chart device 20-2 has a device parameter of "M=2," and the calibration chart device is specified with the device parameter M, whereby a desired marker can be selected from among the plural markers whose distances from the infrared camera are different. The shooting controller initializes the device parameter M, for example, setting to "M=1," and proceeds to step ST43.

The shooting controller initializes the positions of the markers in step ST43. The shooting controller 37a sets each of count values of the horizontal marker 21H and the vertical marker 21V to be "0," for example. Further, the shooting controller 37 transforms the count values to the position information, based on the transformation information, and sets an initial position of the horizontal marker 21H in the vertical direction and an initial position of the vertical marker 21V in the horizontal direction and proceeds to step ST44.

The shooting controller performs vertical marker movement processing in step ST44. The shooting controller 37a controls the calibration chart device 20-m to move the vertical marker 21V to the set horizontal position and proceeds to step ST45.

The shooting controller gives shooting instruction in step ST45. The shooting controller 37a outputs the shooting instruction to the infrared camera IRC to obtain one frame of the infrared image in which the calibration chart device 20-m is shot and proceeds to step ST46.

The shooting controller sets a horizontal update position in step ST46. The shooting controller 37a adds a predetermined amount to the count value of the vertical marker 21V to newly set a horizontal position of the vertical marker 21V and proceeds to step ST47.

The shooting controller determines whether the updated position exceeds a limit, in step ST47. The shooting controller 37a returns to step ST44 in a case where the updated position set in step ST46 does not exceed a horizontal movement range of the vertical marker 21V or proceeds to step ST48 in a case where the updated position exceeds the horizontal movement range.

The shooting controller performs horizontal marker movement processing in step ST48. The shooting controller 37a controls the calibration chart device 20 to move the horizontal marker 21H to the set vertical position and proceeds to step ST49.

The shooting controller gives shooting instruction in step ST49. The shooting controller 37a outputs the shooting instruction to the infrared camera IRC to obtain one frame of the infrared image in which the calibration chart device 20-m is shot and proceeds to step ST50.

The shooting controller sets a vertical update position in step ST50. The shooting controller 37a adds a predetermined amount to the count value of the horizontal marker 21H to newly set a vertical position of the horizontal marker 21H and proceeds to step ST51.

The shooting controller determines whether the updated position exceeds a limit, in step ST51. The shooting controller 37a returns to step ST48 in a case where the updated position set in step ST50 does not exceed a vertical movement range of the horizontal marker 21H or proceeds to step ST52 in a case where the updated position exceeds the vertical movement range.

The shooting controller updates the device parameter M in step ST52. The shooting controller 37a adds "1" to the current device parameter M to define the added result as a new device parameter M and proceeds to step ST53.

The shooting controller determines whether a device corresponding to the device parameter M is present, in step ST53. In a case where the calibration chart device corresponding to the updated device parameter M set in step ST51 is provided in the calibration system, the shooting controller 37a returns to step ST43. In addition, in a case where the calibration chart device corresponding to the updated device parameter M is not provided in the calibration system, the shooting controller 37a proceeds to step ST54.

The shooting controller gives peak detection instruction in step ST54. When processing in step ST43 to step ST53 is performed, the vertical marker 21V is sequentially moved in the horizontal direction within the horizontal movement range to cause the infrared camera IRC to obtain the infrared image shot at each movement position, and the horizontal marker 21H is sequentially moved in the vertical direction within the vertical movement range to cause the infrared camera IRC to obtain the infrared image shot at each movement position. Those infrared images are obtained for each of the calibration chart devices. Therefore, the shooting controller 37a causes the peak detector 32 to detect the positions of the horizontal marker 21H and the vertical marker 21V at which the pixel value becomes the peak at each pixel position, based on the infrared images thus obtained, for each of the markers whose distances from the infrared camera are different (for each of the calibration chart devices). Note that each of the infrared images is associated with the count values of the horizontal marker 21H and the vertical marker 21V.

The peak detector 32 performs the processing of the flowchart illustrated in FIG. 7 for each of the markers whose distances from the infrared camera are different (for each of the calibration chart devices). Further, when the peak detector 32 performs the above-described processing, the peak counter matrix indicates, for each pixel, the count value in which the pixel value in the horizontal direction is maximized and the count value in which the pixel value in the vertical direction is maximized, for each of the markers whose distances from the infrared camera are different.

The information synthesis section 35 changes the count values indicated in the peak counter matrix generated by the peak detector 32 to a position by using the transformation information stored in the transformation information storage 34. Further, the information synthesis section 35 generates the chart position information indicating whether each pixel is a pixel corresponding to the horizontal marker 21H or the vertical marker 21V, for each of the markers whose distances from the infrared camera are different. Furthermore, the information synthesis section 35 outputs the generated chart position information and the physical information obtained from the chart physical information storage 33 to the calibration processor 36.

In the calibration processor 36, correspondence relations between the pixel and the marker positions in the calibration chart devices are clarified with the chart position information, and a relative positional relation between the calibration chart devices is also clarified with the physical information. In other words, a three-dimensional position (x1, y1, z1) of the calibration chart device 20-1 and a three-dimensional position (x2, y2, z2) of the calibration chart device 20-2 corresponding to a pixel (x, y) of the two-dimensional infrared image are clarified. Accordingly, when the processing similar to that disclosed in the above-described technical literature is performed, the internal parameters of the infrared camera IRC and the external parameters can be calculated, even if the distances from the infrared camera IRC to the calibration chart devices 20-1 and 20-2 are not clarified.

According to the second exemplary embodiment described above, not only the internal parameters of the infrared camera IRC but also the external parameters regarding the infrared camera IRC and the calibration chart devices 20-1 and 20-2 can be calculated. In addition, since the plurality of markers whose distances from the infrared camera are different are used, stability of the calculation of the camera parameters can be improved in comparison with the first exemplary embodiment. Furthermore, the calibration processing can efficiently be performed with low cost and with ease, without increasing the size of the inspection jig, for example, similarly to the first exemplary embodiment.

4. Other Exemplary Embodiments

Meanwhile, in the above-described exemplary embodiments, the marker positions are calculated based on the count values. However, in a case where the positions of the horizontal marker 21H and the vertical marker 21V can be obtained from the calibration chart device, the transformation information storage does not need to be provided. In this case, the calibration device detects the peak or calculates the camera parameters by using the positions obtained from the calibration chart device.

In addition, in the calibration chart device, the horizontal marker 21H and the vertical marker 21V are separately provided to vertically move the horizontal marker 21H and horizontally move the vertical marker 21V. However, one marker may be provided and moved while a direction of this marker is switched. In other words, when the marker is in the horizontal marker direction, the marker may be vertically movable, and when the marker is in the vertical marker direction, the marker may be horizontally movable. Furthermore, when the distance from the infrared camera IRC to the marker can be modified, the marker may be located at plural different positions and may be moved horizontally and vertically.

In addition, the peak detector 32 may detect the peak of the pixel value every time the image is accumulated in the image accumulation section 31, and when the peak value is detected, the peak detector 32 may use the infrared image of an immediately precedent marker position and the infrared image of an immediately subsequent marker position relative to the infrared image from which the peak is detected, to detect the position at which the pixel value becomes the peak more accurately than a movement unit of the marker.

In addition, a sensitivity region of the above-described infrared camera IRC may be any region from a far-infrared region to a near-infrared region. For example, in a case where the sensitivity of the infrared camera IRC is in the far-infrared region, the horizontal marker 21H and the vertical marker 21V are each configured with the heating body and the diffuser as described above. In addition, in a case where the sensitivity of the infrared camera IRC is in the near-infrared region, the horizontal marker 21H and the vertical marker 21V may each be configured with, for example, a near-infrared-ray emitting body and a translucent near-infrared-ray diffuser that scatters the near-infrared rays, to cause a distribution of a near-infrared-ray radiation amount along the movement direction to be the unimodal distribution.

In addition, the calibration chart device may not only output the calculated camera parameters to the outside but also store the calculated camera parameters such as the internal parameters in the infrared camera IRC. In this case, the infrared camera IRC can output an infrared image whose lens distortion and the like occurring in the infrared camera are corrected, by using the stored camera parameters.

5. Application Example

Figure 12:
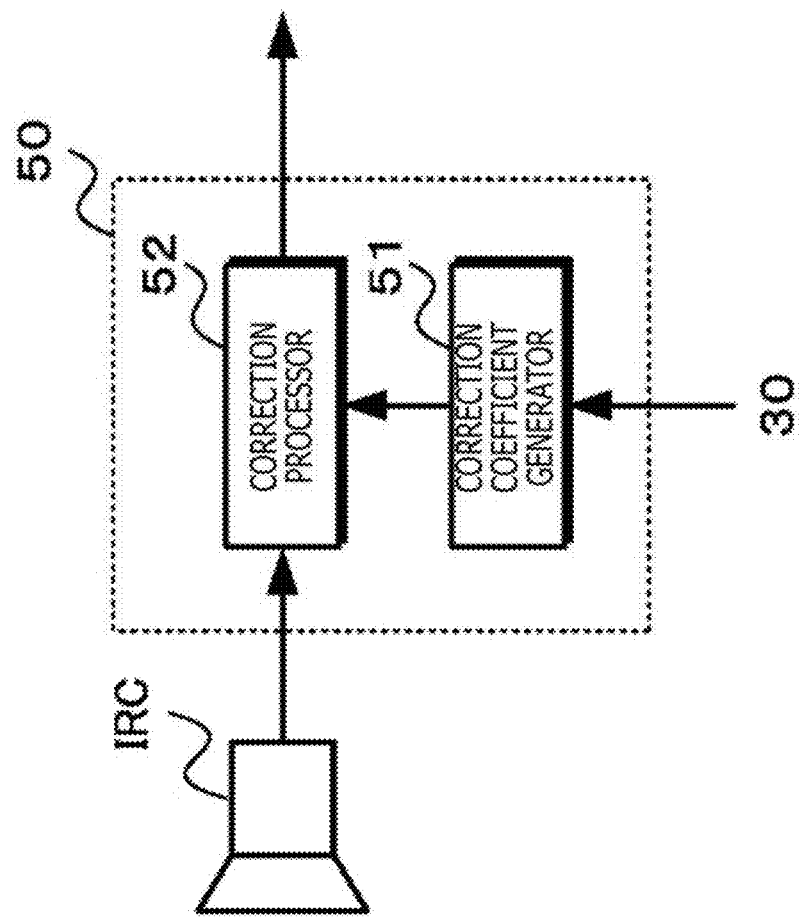
FIG. 12 is a diagram illustrating a case where a device that uses camera parameters is a distortion correction device.

Next, as an application example, a device that uses the camera parameters calculated by the calibration device will be described. FIG. 12 illustrates a case where the device that uses the camera parameters is a distortion correction device.

The distortion correction device 50 includes a correction coefficient generator 51 and a correction processor 52 and uses the camera parameters calculated by the calibration device 30 (30a) to generate an image without distortion from the infrared image generated by the infrared camera IRC.

The correction coefficient generator 51 generates a correction coefficient K indicating a relation between a coordinate value of the infrared image and a coordinate value of the image without distortion, based on the camera parameters. The correction processor 52 performs processing for multiplying the coordinate value of the image without distortion by the correction coefficient K generated by the correction coefficient generator 51 to correspond to the coordinate value of the infrared image. This causes a pixel having a coordinate value (u', v') of the infrared image to be a pixel having a coordinate value (u, v) of the image without distortion. Accordingly, the distortion correction device 50 can eliminate distortion of the infrared image generated by the infrared camera IRC.

In addition, in a case where the infrared camera is provided to a moving-body device such as an automobile or an unmanned flying object, a medical treatment apparatus, or a measurement apparatus, for example, to obtain an infrared image, when the camera parameters calculated using the calibration chart device and the calibration device as described in the present technology are used, an infrared image whose distortion is eliminated with high accuracy can be obtained, for example.

A series of processing described in the specification can be performed by hardware, software, or a combined configuration of hardware and software. In a case where the series of processing is performed by software, a program recording a processing sequence is installed in a memory in a computer embedded in dedicated hardware to be executed. Alternatively, the program can be installed in a general-purpose computer that can perform various kinds of processing, to be executed.

For example, the program can be stored in advance in a hard disc, an SSD (Solid State Drive), or a ROM (Read Only Memory) serving as a recording medium. Alternatively, the program can temporarily or permanently be stored (recorded) in a removable recording medium such as a flexible disc, a CD-ROM (Compact Disc Read Only Memory), an MO (Magneto optical) disc, a DVD (Digital Versatile Disc), a BD (Blu-Ray Disc (registered trademark)), a magnetic disc, or a semiconductor memory card. Such a removable recording medium can be provided as what is generally called package software.

Alternatively, the program may be installed in the computer from the removable recording medium or may be transferred from a download site to the computer wiredly or wirelessly through a network such as a LAN (Local Area Network) or the Internet. The computer can receive the program thus transferred and can install the program in a recording medium such as a built-in hard disc.

Note that effects described in this specification are illustrative in nature and are not limited. Additional effects that are not described in this specification may be provided. Further, the present technology should not be construed by being limited to the exemplary embodiments of the above-described technology. The exemplary embodiments of this technology disclose the present technology in a form of illustration, and it is obvious that persons skilled in the art can modify and substitute the exemplary embodiments without departing from the gist of the present technology. In other words, to determine the gist of the present technology, the claims should be examined.

Further, the calibration device of the present technology can also adopt the following configurations.

(1) A calibration device including:

a peak detector that detects, from plural infrared images shot by sequentially moving a marker whose distribution of an infrared-ray radiation amount in a moving direction is a unimodal distribution in a first direction and plural infrared images shot by sequentially moving the marker in a second direction different from the first direction, a position of the marker at which a pixel value is maximized for each pixel; and a calibration processor that calculates a camera parameter by using the position of the marker detected by the peak detector for each pixel.

(2)

The calibration device according to item (1), in which the peak detector performs interpolation processing using pixel values of the plural infrared images in which positions of the marker are different and detects the position of the marker at which the pixel value is maximized.

(3)

The calibration device according to item (2), in which the calibration processor calculates the camera parameter by using the position of the marker detected for each pixel and a distance from an infrared camera that shot the infrared images to the marker.

(4)

The calibration device according to item (2), in which the marker is configured with plural markers whose distances from the infrared camera that shot the infrared images are different, the plural infrared images include infrared images shot by sequentially moving each of the plural markers in the first direction and infrared images shot by sequentially moving each of the plural markers in the second direction, the peak detector detects the position at which the pixel value is maximized, for each of the plural markers, and the calibration processor calculates the camera parameter using the position of the marker detected for each pixel and for each of the plural markers and a distance between the plural markers.

(5)

The calibration device according to any one of items (1) to (4), in which the marker is shot in the infrared images with a width more than or equal to one pixel in the moving direction.

(6)

The calibration device according to any one of items (1) to (5), in which the first direction and the second direction are orthogonal to each other.

(7)

The calibration device according to any one of items (1) to (6), in which the first direction and the second direction are orthogonal to an optical axis of the infrared camera that shoots the marker.

Further, the calibration chart device of the present technology can also adopt the following configurations.

(1)

A calibration chart device including:

a marker whose distribution of an infrared-ray radiation amount in a moving direction is a unimodal distribution; and a driving controller that separately moves the marker in a first direction and a second direction different from the first direction.

(2)

The calibration chart device according to item (1), in which the first direction and the second direction are orthogonal to each other.

(3)

The calibration chart device according to item (1) or (2), in which the marker is provided in plural numbers in a direction orthogonal to the first direction and the second direction with a predetermined interval left.

(4)

The calibration chart device according to any one of items (1) to (3), in which the marker is configured with a marker that moves in the first direction and a marker that moves in the second direction.

(5)

The calibration chart device according to any one of items (1) to (4), in which the first direction and the second direction are orthogonal to an optical axis of an infrared camera that shoots the marker.

(6)

The calibration chart device according to any one of items (1) to (5), in which the marker is shot with a width more than or equal to one pixel of the infrared camera in the moving direction.

INDUSTRIAL APPLICABILITY

In a calibration device, a calibration method, and a calibration chart device in this technology, a peak detector detects, from plural infrared images shot by sequentially moving a marker whose distribution of an infrared-ray radiation amount in a moving direction is a unimodal distribution in a first direction and plural infrared images shot by sequentially moving the marker in a second direction different from the first direction, a position of the marker at which a pixel value is maximized, for each pixel, and a calibration processor calculates a camera parameter using the position of the marker detected by the peak detector for each pixel. Therefore, calibration of an infrared camera can be performed with ease. Accordingly, the calibration device, the calibration method, and the calibration chart device are applicable to an infrared camera used in a measurement apparatus or a transportation apparatus, for example.

REFERENCE SIGNS LIST

10 . . . Calibration system
20, 20-1, 20-2, 20-*m* . . . Calibration chart device
21H . . . Horizontal marker
21V . . . Vertical marker
22H . . . Horizontal marker slider
22V . . . Vertical marker slider
23 . . . Slider driver
25 . . . Frame
30, 30*a* . . . Calibration device
31 . . . Image accumulation section
32 . . . Peak detector
33, 33*a* . . . Chart physical information storage
34 . . . Transformation information storage
35 . . . Information synthesis section
36, 36*a* . . . Calibration processor
37, 37*a* . . . Shooting controller
50 . . . Distortion correction device 51 . . . Correction coefficient generator
52 . . . Correction processor
211H . . . Rectilinear heating body
212H . . . Diffuser

The invention claimed is:

1. A calibration device, comprising:
a peak detector configured to detect, from plural infrared images shot by sequentially moving a marker whose distribution of an infrared-ray radiation amount in a moving direction is a unimodal distribution in a first direction and plural infrared images shot by sequentially moving the marker in a second direction different from the first direction, a position of the marker at which a pixel value is maximized, for each pixel; and
a calibration processor configured to calculate a camera parameter using the position of the marker detected by the peak detector for each pixel.

2. The calibration device according to claim 1, wherein the peak detector is further configured to perform interpolation processing using pixel values of the plural infrared images in which positions of the marker are different and detect the position of the marker at which the pixel value is maximized.

3. The calibration device according to claim 2, wherein the calibration processor is further configured to calculate the camera parameter by using the position of the marker detected for each pixel and a distance from an infrared camera that shot the plural infrared images to the marker.

4. The calibration device according to claim 2, wherein the marker is configured with plural markers whose distances from an infrared camera that shot the plural infrared images are different,
the plural infrared images include infrared images shot by sequentially moving each of the plural markers in the first direction and infrared images shot by sequentially moving each of the plural markers in the second direction,
the peak detector is further configured to detect the position in which the pixel value is maximized, for each of the plural markers, and
the calibration processor is further configured to calculate the camera parameter by using the position of the marker detected for each pixel and for each of the plural markers and a distance between the plural markers.

5. The calibration device according to claim 1, wherein the marker is shot in the plural infrared images, with a width more than or equal to one pixel in the moving direction.

6. The calibration device according to claim 1, wherein the first direction and the second direction are orthogonal to each other.

7. The calibration device according to claim 1, wherein the first direction and the second direction are orthogonal to an optical axis of an infrared camera that shoots the marker.

8. A calibration method, comprising:
causing a peak detector to detect, from plural infrared images shot by sequentially moving a marker whose distribution of an infrared-ray radiation amount in a moving direction is a unimodal distribution in a first direction and plural infrared images shot by sequentially moving the marker in a second direction different from the first direction, a position of the marker at which a pixel value is maximized, for each pixel; and
causing a calibration processor to calculate a camera parameter by using the position of the marker detected by the peak detector for each pixel.

9. A calibration chart device, comprising:
a marker whose distribution of an infrared-ray radiation amount in a moving direction is a unimodal distribution; and
a driving controller configured to separately move the marker in a first direction and a second direction different from the first direction.

10. The calibration chart device according to claim 9, wherein
the first direction and the second direction are orthogonal to each other.

11. The calibration chart device according to claim 9, wherein
the marker is provided in plural numbers in a direction orthogonal to the first direction and the second direction with a predetermined interval left.

12. The calibration chart device according to claim 9, wherein
the marker is configured with a marker that moves in the first direction and a marker that moves in the second direction.

13. The calibration chart device according to claim 9, wherein
the first direction and the second direction are orthogonal to an optical axis of an infrared camera that shoots the marker.

14. The calibration chart device according to claim 9, wherein
the marker is shot with a width more than or equal to one pixel of an infrared camera in the moving direction.

* * * * *